(12) United States Patent
Perlin

(10) Patent No.: US 6,239,830 B1
(45) Date of Patent: *May 29, 2001

(54) DISPLAYER AND METHOD FOR DISPLAYING

(75) Inventor: Kenneth Perlin, New York, NY (US)

(73) Assignee: New York University, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/312,998

(22) Filed: May 17, 1999

Related U.S. Application Data

(63) Continuation-in-part of application No. 09/010,313, filed on Jan. 21, 1998.

(51) Int. Cl.[7] ............................ H04N 13/04; G09H 5/00; G02B 27/22
(52) U.S. Cl. ................. 348/51; 348/42; 348/59; 345/6; 345/139; 359/466
(58) Field of Search ........................... 348/39–40, 42–44, 348/46–51, 54, 56, 59; 359/23, 458, 462–464, 466–467, 470; 345/6, 139

(56) References Cited

U.S. PATENT DOCUMENTS

| 5,315,377 | * | 5/1994 | Isono et al. | 348/51 |
| 5,614,941 | * | 3/1997 | Hines | 348/42 |
| 5,712,732 | | 1/1998 | Street | 348/51 |
| 5,771,121 | * | 6/1998 | Henstchke | 348/51 |
| 5,802,410 | * | 9/1998 | Wah Lo et al. | 348/42 |
| 5,986,804 | * | 11/1999 | Mashitani et al. | 348/51 |
| 6,061,084 | * | 5/2000 | Perlin | 348/51 |
| 6,069,649 | * | 5/2000 | Hattori | 348/51 |
| 6,075,557 | * | 6/2000 | Holliman et al. | 348/51 |
| 6,078,351 | * | 6/2000 | Hall, Jr. et al. | 348/51 |

* cited by examiner

Primary Examiner—Vu Le
(74) Attorney, Agent, or Firm—Ansel M. Schwartz

(57) ABSTRACT

A displayer. The displayer comprises a sensor mechanism for identifying where N different eyes of V viewers are in space, where N is greater than or equal to 2 and is an integer and V is greater than or equal to 1 and is an integer. The displayer comprises a displaying mechanism for displaying N different images to N different eyes where each image is a function of where each eye is in space to which the respective image is associated. The displaying mechanism is remote and apart from and out of contact with the V viewers. The displaying mechanism is in communication with the sensor mechanism. The displaying mechanism includes a computer which receives information from the sensor mechanism identifying where each eye is in space and produces the images. The computer causes a first image of the N images and a second image of the N images associated with a first viewer of the V viewers to be shown interleaved on the first screen wherein spacing between the interleaved first image and second image varies as a function of where each eye is in space to which the respective image is associated. A method for displaying.

23 Claims, 3 Drawing Sheets

VIEWER DISTANCE: 11 INCHES

DISPLAYER AND METHOD FOR DISPLAYING

This is a continuation-in-part application of U.S. patent application Ser. No. 09/010,313 filed Jan. 21, 1998, pending.

FIELD OF THE INVENTION

The present invention is related to autostereo devices. More specifically, the present invention is related to autostereo devices that have a display which does not contact the viewer and the image seen by the viewer corresponds with the position of the viewer.

BACKGROUND OF THE INVENTION

Imagine you could see a virtual animated object or figure standing right in front of you, with all the realism of an actual object in space. When you move your head, the animated figure knows where you are, and turns to look at you. If you get nearer or farther, the sense of reality and dimensionality is maintained.

Imagine further that the display device to support this fits easily on your desk top or mounted on your door or wall, does not require you to wear any special glasses or equipment over your eyes, has no moving parts, and can be made on the order of an inch or two thick from back to front. The spatial resolution would be fully equal to that of a modern LCD display.

This would open up many practical applications. Molecular biologists or CAD designers could work directly with their models, without needing to wear eye-apparatus that would otherwise impede their vision. Unlike existing autostereo displays, these users would not need to remain at a constant distance from the screen. A surgeon could see, in full stereo three dimensions, an interior view of the patient, without being required to wear any eye-apparatus that would otherwise hinder the view of the real patient. Video telephony could offer the immediacy and spatial depth of true face to face conversation. An interactive animated figure could be presented to the public in stores and other venues with the same immediacy as an animatronic figure, but without the latter's expense and physical limitations. Consumers could interact with games or animated characters at home which possess a complete sense of realism and dimensionality.

This technology would make possible a portable display, about the size of a notebook computer without the keyboard, which could be moved around freely in position and orientation. It would enable a person looking through it to see different views of a virtual object in the room.

SUMMARY OF THE INVENTION

The present invention pertains to a displayer. The displayer comprises a sensor mechanism for identifying where N different eyes of V viewers are in space, where N is greater than or equal to 2 and is an integer and V is greater than or equal to 1 and is an integer. The displayer comprises a displaying mechanism for displaying N different images to N different eyes where each image is a function of where each eye is in space to which the respective image is associated. The displaying mechanism is remote and apart from and out of contact with the V viewers. The displaying mechanism is in communication with the sensor mechanism. The displaying mechanism includes a computer which receives information from the sensor mechanism identifying where each eye is in space and produces said images, the computer causes a first image of the N images and a second image of the N images associated with a first viewer of the V viewers to be shown interleaved on the first screen wherein spacing between the interleaved first image and second image varies as a function of where each eye is in space to which the respective image is associated.

The present invention pertains to a method for displaying. The method comprises the steps of viewing where a viewer is disposed in space with a camera. Then there is the step of determining where the viewer's first eye and second eye are disposed in space with a computer connected to the camera. Next there is the step of interleaving a first image and a second image onto a first screen. Then there is the step of coordinating a display of a mask pattern on a second screen disposed between the first screen and the viewer so the viewer only sees the first image of the first screen with the viewer's first eye and only sees the second screen with the viewer's second eye.

The present invention pertains to a displayer. The displayer comprises a sensor mechanism for identifying where N different eyes of the viewers are in space, where N is greater than or equal to 2 and is in integer and V is greater than or equal to 1 and is an integer. The displayer comprises a mechanism for displaying N different images to N different eyes where each image is a function of where each eye is in space to which the respective image is associated. The displaying mechanism has no moving parts. The displaying mechanism is in communication with the sensor mechanism.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
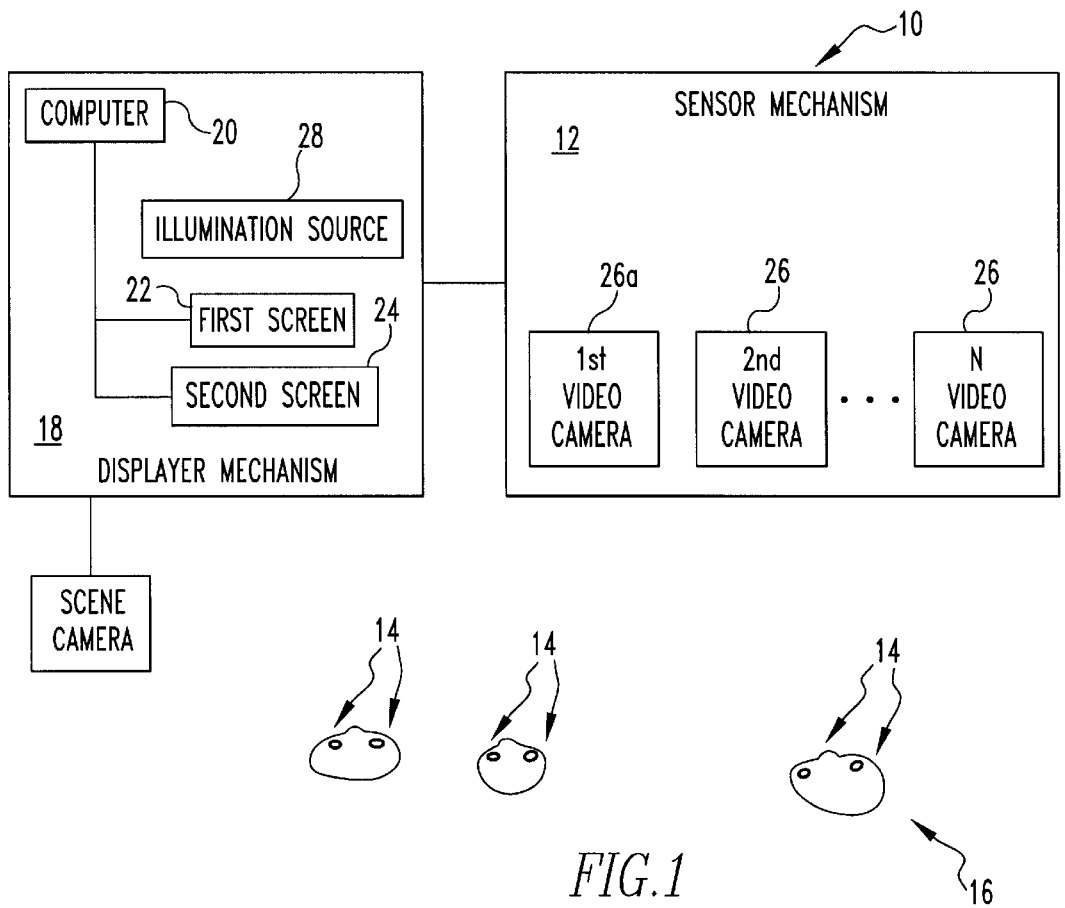
FIG. 1 is a block diagram of a displayer of the present invention.
Figure 2:
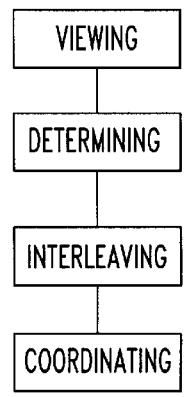
FIG. 2 is a flow chart of a method of the present invention.

Referring now to the drawings wherein like reference numerals refer to similar or identical parts throughout the several views, and more specifically to FIG. 1 thereof, there is shown a displayer 10. The displayer 10 comprises a sensor mechanism 12 for identifying where N different eyes 14 of V viewers 16 are in space, where N is greater than or equal to 2 and is an integer and V is greater than or equal to 1 and is an integer. The displayer 10 comprises a displaying mechanism 18 for displaying N different images to N different eyes 14 where each image is a function of where each eye is in space to which the respective image is associated. The displaying mechanism 18 is remote and apart from and out of contact with the V viewers 16. The displaying mechanism 18 is in communication with the sensor mechanism 12.

Preferably, the displaying mechanism includes a computer which receives information from the sensor mechanism identifying where each eye is in space and produces the images. The computer causes a first image of the N images and a second image of the N images associated with a first viewer of the V viewers to be shown interleaved on the first screen wherein spacing between the interleaved first image and second image varies as a function of where each eye is in space to which the respective image is associated.

Preferably, the displaying mechanism 18 produces the N different images so each of the N eyes 14 can only see its associated image and no other image of the N images. The displaying mechanism 18 preferably includes a computer 20 which receives information from the sensor mechanism 12 identifying where each eye is in space and produces the images. Preferably, the displaying mechanism 18 includes a first screen 22 connected to the computer 20 on which the image is shown, and a second screen 24 adapted to be adjacent to and disposed between the first screen 22 and the N eyes 14 which selectively reveals portions of the first screen 22 to viewers 16. Preferably, the displaying mechanism 18 includes an illumination source 28 disposed behind the first screen 22 which illuminates the first screen 22.

Figure 3A:
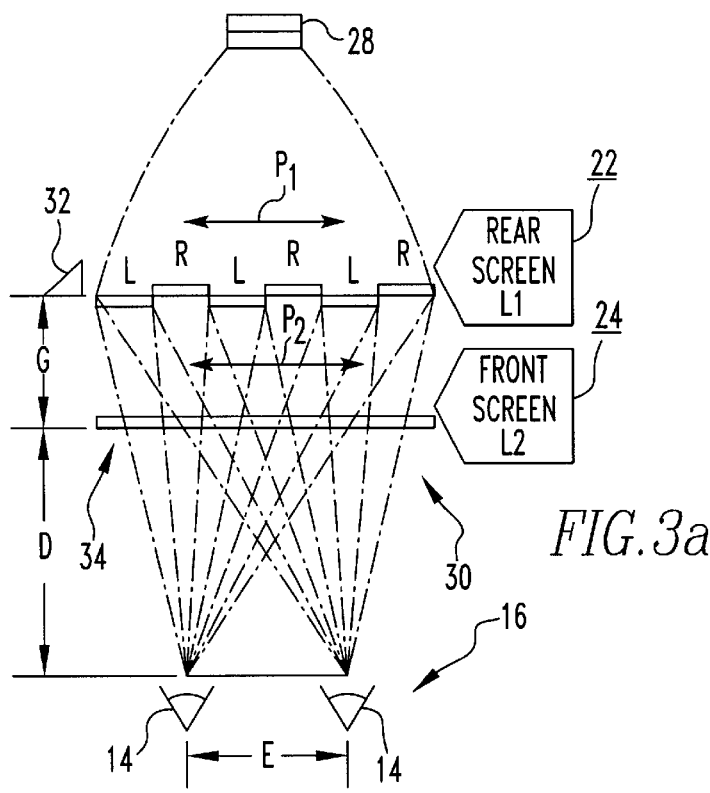
FIGS. 3a, 3b and 3c are schematic representations of a viewer in regard to the displayer.
Figure 3B:
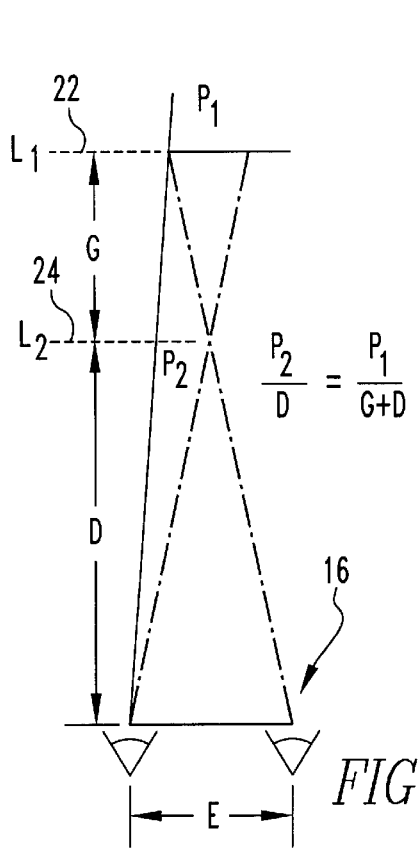
Figure 3C:
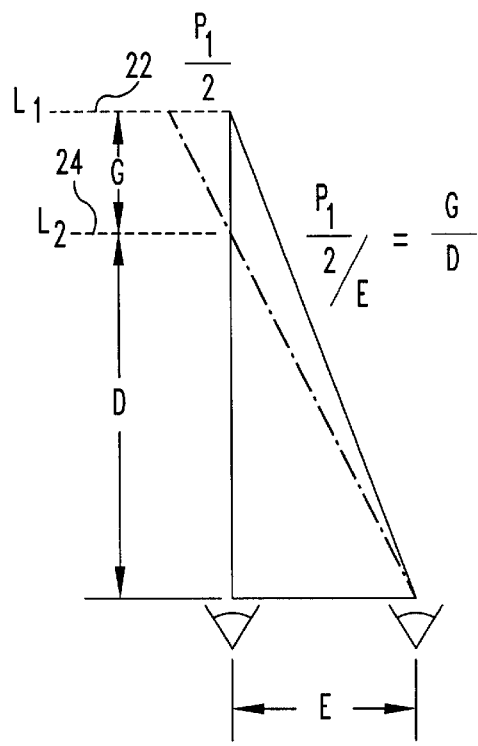

The computer 20 preferably causes a first image of the N images and a second image of the N images associated with a first viewer of the V viewers 16 to be shown interleaved on the first screen 22. Additionally, the computer 20 causes a mask pattern 30 to be shown on the second screen 24 corresponding to the interleaving of the first and second images so the first viewer can only see the first image with the first viewer's first eye and the second image with the first viewer's second eye, as shown in FIGS. 3a, 3b and 3c. Preferably, the first image and second image are interleaved vertical image stripes 32 and the mask pattern 30 comprises light blocking opaque vertical stripes 34 that change as the first viewer moves so the first viewer can always see the first image with the first eye and the second image with the seconded eye. The width of the vertical opaque stripes 34 of the mask pattern 30 preferably varies dynamically according to the ratio (gap between image and mask)/(half the mask stripe width)

EQUALS (observer's distance from screen)/(distance between left and right eye).

Preferably, the spacing between the interleaved vertical image stripes is a tapered perspective linear function. The nth location in the sequence of stripe locations on the first screen can be calculated by iterating $x_{n+1}=AX_n+B$:

$x_0=0$   $x_1=B$   $x_2=AB+B$   $x_3=A^2B+AB+B$ $x_n=B(A^{n-1}+\ldots+A+1)$ $A=(1-p_y^{-1})/(1-q_y^{-1})$ $B=(p_xp_y^{-1}-q_xq_y^{-1})/(1-q_y^{-1})$ and the position of the two eyes of the viewer are $p=(p_x,p_y)$ and $q=(q_x,q_y)$.

The sensor mechanism 12 preferably includes a first video camera 26a adjacent a second screen 24 which monitors where the eyes 14 are in space. Preferably, the sensor mechanism 12 includes V video cameras 26 to locate the position of the eyes 14 of the V viewers 16. The mask pattern 30 preferably has clear stripes disposed between the opaque stripes 34, and there is a distance of P 2 between the left edge of each clear stripe, and the width of each clear stripe is P ⅔. Preferably, the computer 20 interleaves the first and second images of the first screen 22 into evenly spaced vertical image stripes 32 so that from the first viewer's first eye even numbered image stripes are completely blocked by opaque stripes 34 on the second screen 24 and from the first viewer's second eye odd numbered image stripes are completely blocked by opaque stripes 34 on the second screen 24.

The N images are preferably synthetically generated and formed into the first and second images by synthetic image interpolation by the computer 20. Preferably, the displayer 10 includes a scene camera mechanism which takes pictures for the N images and the computer 20 forms the first and second images by synthetic image interpolation.

The present invention pertains to a method for displaying. A flow chart of the method is shown in FIG. 3. The method comprises the steps of viewing where a viewer is disposed in space with a camera. Then there is the step of determining where the viewer's first eye and second eye are disposed in space with a computer 20 connected to the camera. Next there is the step of interleaving a first image and a second image onto a first screen 22. Next there is the step of varying spacing between the interleaved first image and second image as a function of where each eye is in space to which the respective image is associated. Then there is the step of coordinating a display of a mask pattern 30 on a second screen 24 disposed between the first screen 22 and the viewer so the viewer only sees the first image of the first screen 22 with the viewer's first eye and only sees the second screen 24 with the viewer's second eye.

Preferably, after the coordinating step, there are the steps of moving the viewer in space. Then there is the step of changing the mask pattern 30 dynamically to make opaque stripes 34 narrower when the viewer moves away from the second screen 24 and to make the opaque stripes 34 wider as the viewer moves toward the second screen 24.

The present invention pertains to a displayer 10. The displayer 10 comprises a sensor mechanism 12 for identifying where N different eyes 14 of the viewers 16 are in space, where N is greater than or equal to 2 and is in integer and V is greater than or equal to 1 and is an integer. The displayer 10 comprises a mechanism for displaying N different images to N different eyes 14 where each image is a function of where each eye is in space to which the respective image is associated. The displaying mechanism 18 has no moving parts. The displaying mechanism 18 is in communication with the sensor mechanism 12.

In the operation of the preferred embodiment, the displayer 10 comprises two LCD screens, a rear screen L1 and a front screen L2, with a gap of width G between them, where G is on the order of one or two inches. Each LCD display is capable of displaying successive images at around 120 frames per second. Behind the rear screen L1 is a rectangular light source that provides even illumination, such as a light box. Alternately, screen L1 and the light box can be replaced by a CRT capable of at least 120 images per second. Thomas Electronics in Wayne N.J. is one example of a manufacturer of such fast CRTs.

Mounted above, below or to the side of the front screen L2 is a video camera 26, which is aimed toward the observer. Alternately, there can be two video cameras 26 aimed toward the observer, side by side. Both LCD displays are connected by a computer 20, which sends a time-varying image to both screens.

There can be multiple copies of the above apparatus, all identical, for video-telephony. In this case their respective computers 20 would be networked together.

In the operation of the displayer, from start to finish, as seen by the observer, and how it is used, the observer sees an object floating in the center of the front screen L1. The object looks fully three-dimensional, and can appear to extend both in front of and behind the plane of this screen. When the observer moves his head in any direction (up/down, left/right, front/back), and/or tilts his head to the side, the object appears to remain in the correct position, as would a real object.

If the object is an animated character, then the character can be aware of the observers physical position. For example, if the character is both facing toward and looking at the observer, and the observer moves his own head to one side, then the observer will correctly see part of one side of the characters body, yet the character can simultaneously gesture or turn its head and eyes 14 toward that side so that it continues to look at the observer.

If two observers are looking at different copies of the apparatus which are networked together, then each observer will see the others head as a full three dimensional form. When one observer moves his head to the side, he will correctly see part-way around the side of the other observers head, and the other observer will have an accurate view of the first observers new head position. Each observer will properly track the other observers gaze.

In regard to how the displayer 10 operates, the internal sequence of operation that is making it work is now described. As is true for all autostereo devices, the basic operation of the mechanism described here is to present an image to the left eye that the right eye cannot see, and a different image to the right eye that the left eye cannot see. The mechanism adjusts itself as the observer changes his/her position in space. What is new is the ability to do this over a wide range of observer positions, including the observers distance and head tilt, in a compact mechanism that has no moving parts.

There are already mechanisms in existence to present different images to a observers left and right eyes 14 for autostereo display, but they all suffer from at least one of the following drawbacks:

1. requiring a large and bulky optical system
2. requiring the observers head to be at or near a particular fixed distance from the plane of the display screen,
3. requiring a mechanical motion of the display mechanism to follow the movements of the observers head.
4. being "holographic", in the sense of requiring the simultaneous generation of a large number of different views, to account for all the places the observers eyes 14 might be located.

The holographic approach allows many observers to view the scene simultaneously, but necessitates either many cameras, in the case where the source of the scene is the real world, or else a large amount of computation, in the case where the scene is synthetically generated. For example, there is a class of holographic approaches called "zone" methods, in which N views are generated, each visible from a limited zone in space. The observer moves his/her head so that his eyes 14 fall into two different zones, the left and right eye thereby each seeing different views. This allows a limited movement by the observer, and doesn't require the system to track the observer.

With respect to the displayer 10, the observers left and right eye are presented with two different images. This is done by showing the two images interleaved in vertical stripes on the rear screen, and using a light-blocking vertical stripe masking pattern on the front screen that changes as the observer moves, so that the observer always can see one image only from his left eye, and the other image only from his right eye. At any given moment, the masking allows the observer to see only one third of each image. By cycling very rapidly between three such masked views, the observer is presented with a complete left and right image at each video frame.

The width of these mask patterns 30 vary dynamically, as the observers distance to the screen changes. As the observer backs away from the screen, the stripes are made narrower, and as the observer approaches the screen the stripes are made wider. In this way, the ratio is always preserved:

(gap between image and mask)/(half the mask stripe width)

EQUALS (observers distance from screen)/(distance between left and right eye) Equation 1

Because this ratio is preserved by varying the stripe width dynamically, rather than by varying the physical gap between the two screens, the use of any moving parts is avoided.

More specifically:

1. The camera monitors the observers eye position, using image processing with feature recognition (which is already enabled by prior art). Based on the observers position, the computer 20 calculates (either synthetically or, in the case of images captured by camera, by synthetic image interpolation between two camera views) the proper image for each of the observers left and right eyes 14 to see. These two images are denoted as IM1 and IM2.
2. The illumination source 28 provides even illumination behind the rear LCD screen, which will become successively masked by each of the two LCD screens (first the rear screen L1, then the front screen L2) before becoming visible by the observer.
3. Based on the observers position, the computer 20 calculates a sequence of evenly spaced vertical opaque and clear stripe patterns on the front screen L2. Light can only travel through the clear stripes. The stripes are spaced as follows:
   The distance from the left edge of each clear stripe to the left edge of the next clear stripe is P2.
   The width of each clear stripe is P2/3.
4. Also based on the observers position, the computer 20 interleaves IM1 and IM2 on the rear screen L1 into evenly spaced vertical stripe zones. These zones are positioned so that
   from the observers left eye the even numbered zones are completely blocked by the opaque stripes 34 of L2, and
   from the observers right eye the odd numbered zones are completely blocked by the opaque stripes 34 of L2.
   The stripe zones are spaced as follows:
   The distance from the left edge of each even numbered stripe zone to the left edge of the next even numbered stripe zone is P1.
   The width of each image stripe is P1/2.
5. The mask stripes on front screen L2 and the alternating image stripes on rear screen L1 are both changed in rapid succession. The time to display one of these stripe patterns is referred to as a "microframe". One entire sequence of three microframes constitutes one "observer frame" of time. For example, a microframe can be $\frac{1}{120}$ second, for an effective frame rate of $\frac{120}{3}$, or 40, observer frames per second.

During any one microframe, the left eye will see ⅓ of an image (through the clear stripes on front screen L2) and the right eye will see ⅓ of an image (through these same clear stripes on front screen L2). To allow the observer to view a complete image with each eye, three offset stripe patterns are displayed in rapid succession. From each microframe to the next, the stripes on screen L2 are offset by P2/3, and the alternating image pattern is offset on screen L1 by P1/3. The observer will subjectively fuse each complete sequence of three microframes into a single evenly illuminated image for the left and right eyes 14.

Note that it is equally good to have the opaque/clear light shutter screen in the back, and the even/odd image stripe screen in the front. In this case, the black/white stripes block the light before it reaches the screen containing the images, rather than after.

In one implementation, a CRT monitor is used as the rear screen L1. A fast-refresh CRT from Thomas Electronics is used, which gives sufficiently fast frame times for flicker-free operation. Also, a standard LCD screen is used for the front masking screen. Although a ferro-electric LCD screen can be used instead, because these can vary their frame time with sufficient rapidity. It can be purchased from Thorn ENI Central Research Laboratories in Middlesex, England.

The observer's position is captured by video camera 26. To describe the exact dimensions used, the following conventions are adopted:

The distance between the observers two eyes 14 is E (generally about 65 millimeters).

At any given moment, the point H half way between the observers eyes 14 is at a distance of D from the front screen L2.

A one dimensional left/right coordinate system is superimposed on the front screen L2 whose origin is the point directly in front of point H.

A one dimensional left/right coordinate system is superimposed on the rear screen L1 whose origin is the point directly in front of point H.

The region on screen L1 that the observers right eye sees through each clear stripe of screen L2 must be displaced P1/2 to the left of the region on screen L1 that the observers left eye sees through the same clear stripe of screen L2. This gives a relationship by similar triangles: inter-screen gap G is to displacement P1/2 as distance D from observer to screen L2 is to eye separation E. Given this, the stripe spacing P1 on the rear screen L1 can be calculated as:

$$P1/2=E*G/D$$

Because screen L1 is further from the observer than is screen L2, its stripes must be made correspondingly bigger, so that the observer will see them visually aligned with those on screen L2. Screen L2 is distance D from the observer, whereas screen L1 is distance D+G from the observer. From this, the stripe spacing P2 on the front screen L2 is calculated as:

$$P2=P1*(D+G)/D$$

For the front screen L2, let a(s) and b(s) denote the position of the left and right edges, respectively, of clear stripe number s, where s= . . . −3,−2,−1,0,1,2,3 . . . Then during each of the three microframes m=0,1,2:

$$a(s)=P2*(s+m/3-1/6)$$

$$b(s)=P2*(s+m/3+1/6)$$

For the rear screen L1, the left and right edges of the even image stripes are given by:

$$P1*(s+m/3-1/2)$$

$$P1*(s+m/3)$$

and the left and right edges of the odd image stripes are given by:

$$P1*(s+m/3)$$

$$P1*(s+m/3+1/2)$$

The reason that a three phase cycle is needed even though the observer has only two eyes 14 is as follows.

If a two phase cycle were used, then the opaque/clear pattern on masking screen L2 would need to be highly precise, and of extremely high resolution. The slightest misalignment would cause the observer to see, from each eye, a small sliver of the image meant for the other eye.

By using three phases, it is ensured that each of the observers eyes 14 looks through a slit on masking screen L2 that is only two thirds as wide as the image stripe on screen L1. This allows for alignment errors up to about a one sixth of an image stripe, before either of the observers two eyes 14 would see any part of the wrong image stripe on screen L1.

The masking front screen L2 needs to have sufficient resolution so that, during each phase of the cycle, each slit on screen L2 is less than half of the width of an entire cycle. In that way, it can be assured that neither eye sees any portion of the wrong image stripe on screen L1.

The smallest full cycle width for screen L2 that has this property is 5 pixels. At this width, cycles can be created with the pattern 1-2-2 pixels, thereby ensuring that the widest slit is at most ⅖ of a full cycle.

The further away the observer is from the display, the smaller the stripe cycle width needs to be. For simplicity, the simplifying approximation is made that twice the distance between the observers eyes 14 is five inches. Then, given that the minimum cycle width on masking screen L2 is 5 pixels, Equation 1 provides that the number of pixel widths measuring the gap between the two screens, must equal the number of inches measuring the distance of the observer from the image screen.

For example, suppose the masking front screen has a pixel size of 0.02 inches. Then to accommodate a maximum observer distance of 40 inches, as measured from rear screen L1, the inter-screen gap needs to be 40 pixels, or 40*0.02 inches=0.8 inches.

If it is desired to accommodate a greater maximum observer distance, then it is needed to increase the inter-screen gap. Conversely, if a higher resolution masking front screen is used, then the inter-screen gap can be decreased.

Head tilt can be easily accommodated for by the observer as long as a two dimensional pixel grid is used for the masking front screen L2. If the observer tilts his head, and we are able to tracked, then the masking stripes on the front screen L2 can be correspondingly tilted, as well as the alternating image stripes on the rear screen L1.

The jagged edges of the masking stripes due to pixel aliasing will be invisible to the observer, because the left and right edges of the masking stripes on front screen L2 fall well within the borders of the observers view of the image stripes on rear screen L1, and because the sum of the three time-alternating phases of masking stripes front screen L2 creates a flat field illumination.

In response to the current location of the observer's two eyes, it is necessary to create a pattern of alternating stripes upon the display surface and the second screen 24 (otherwise known as the active optical shutter), which has the property that each eye is located in a "zone" where the image from the other eye is completely blocked.

Figure 4:
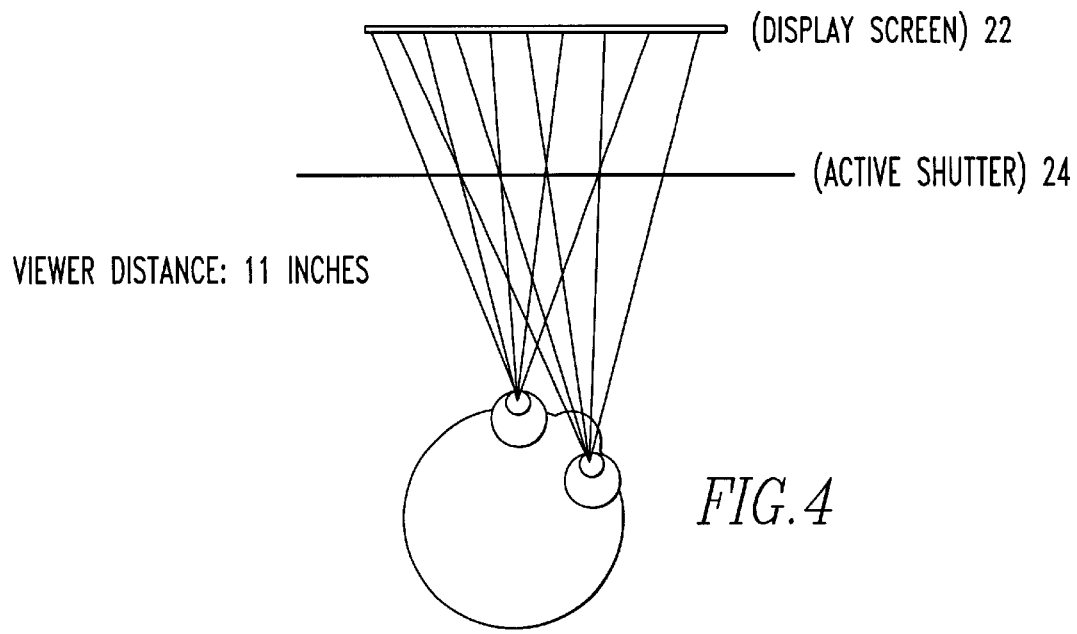
FIG. 4 is a representation of a viewer whose head is turned from the first and second screens.

If the observer is directly facing the first screen 22 otherwise known as the display screen, then the correct pattern will consist of evenly spaced stripes. However, if the user turns his head to the left or the right, then an even stripe spacing is no longer correct. In fact, any even spacing pattern will inevitably result in one of the eyes moving out of this zone. See FIG. 4. Rather, in this case, the optimal spacing is a tapered perspective linear pattern.

Figure 5:
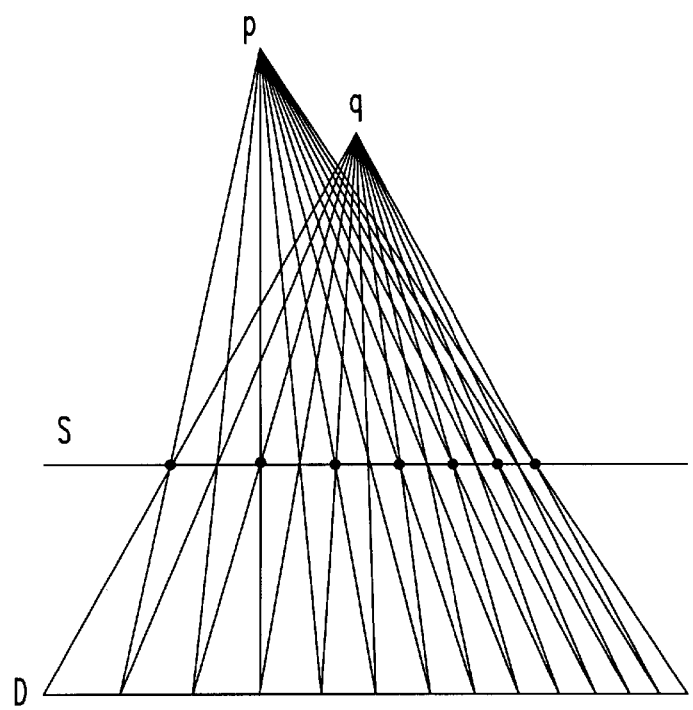
FIG. 5 is a representation of an optimal spacing pattern for the first and second screens for a viewer whose head is turned from the first and second screens.

In FIG. 5 illustrating such an optimal spacing pattern, the two eye positions are: $p=(p_x,p_y)$ and $q=(q_x,q_y)$, the display screen D is on the line y=0, and the shutter S is on the line y=1. The black lines from p and q represent lines of sight where the shutter permits an eye to see a location on the display; the gray lines represent lines of sight where the shutter blocks an eye from seeing a location on the display. Note that the black lines intersect at the shutter screen (indicating that both eyes see through the same openings in the shutter) and also that the black lines alternate on the display screen (indicating that each eye sees an alternate portion of the display screen, which is invisible to the other eye).

Because the eye at q is nearer to the screen than is the eye at p, the spacing between the openings in the shutter (the locations of these openings are represented by black dots in the diagram below) will become successively smaller along the direction from p to q. This will result in a progressive narrowing of stripes, both on the shutter screen S and on the display screen D behind the shutter.

In fact, at the position on the shutter and on the display screen which intersects the line passing between p and q, the spacing between openings, as well as the stripe width, will vanish to identically zero. The mathematical description and derivation of these relationships follows:

Given a location (x,0) on the display screen, the line-of-sight location $f_p(x)$ on the shutter that lies between display screen location (x,0) and eye position p is found by linear interpolation:

$$f_p(x)=P_x p_y^{-1}+x(1-p_y^{-1})$$

Given a location (x,1) on the shutter, the corresponding line-of-sight location on the display screen can be found by inverting the above equation:

$$f_p^{-1}(x)=(x-P_x p_y^{-1})/(1-p_y^{-1})$$

Therefore, given a location $x_n$ on the display screen that is visible through a clear stripe on the shutter from p but not from q, we can find the next location $x_{n+1}$ which is visible through a clear stripe on the shutter from q but not from p, first by finding the location on the shutter $f_q(x_n)$ in the line-of-sight from q, and then finding the corresponding location on the display screen which is in the line-of-sight from p:

$$x_{n+1}=f_p^{-1}(f_q(x_n))$$

which expands out to:

$$(q_x q_y^{-1}+X(1-q_y^{-1})-p_y^{-1})/(1-p_y^{-1})$$

This can be expressed as a linear equation $x_{n+1}=A x_n+B$, where:

$$A=(1-q_y^{-1})/(1-p_y^{-1})$$
$$B=(q_x q_y^{-1}-P_x p_y^{-1})/(1-p_y^{-1})$$

Similarly given this next location $x_{n+1}$ on the display screen that is visible through a clear strip on the shutter from q but not from p, we can find the next location $X_{n+2}$ which is on the display screen that is visible through a clear strip on the shutter from p but not from g, first by finding the location on the shutter $f_p(x_{n+1})$ in the line-of-sight from p, and then finding the corresponding location on the display screen which is in the line-of-sight from q:

$$X_{n+2}=f_q^{-1}(f_p(x_{n+1}))$$

The nth location in the sequence of stripe locations on the display screen can be calculated by iterating $x_{n+1}=A x_n+B$:

$$x_0=0 \quad x_1=B \quad x_2=AB+B \quad X_3=A^2B+AB+B$$

$$x_n=B (A^{n-1}+ \ldots +A+1)$$

The even values in this sequence locate stripes on the display screen which are visible through the shutter from eye point p but not from eye point p, and the odd values in this sequence locate stripes on the display screen which are visible through the shutter from eye point q but not from eye point p.

Given this sequence, the transparent stripes on the shutter are located at $f_p(x_i)$ for all i=0,2,4, . . .

It is advantageous to use a Pi-cell LCD as the optoelectronic shutter for the second screen 24. In comparison with Ferro-electric light shutters (as in Street, U.S. Pat. No. 5,712,732), PI-cell LCDs can be more reliably and inexpensively manufactured at the size desired for direct viewing (e.g.: 19 inch diagonal and upward), and they possess the high contrast, retention of opacity at wide viewing angles, and rapid switching capability (in particular, a good approximation to a square wave at 200 switched cycles per second) required for this use.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A displayer comprising:

a sensor mechanism for identifying where N different eyes of V viewers are in space, where N is greater than or equal to 2 and is in integer and V is greater than or equal to 1 and is an integer; and a displaying mechanism for displaying N different images to N different eyes where each image is a function of where each eye is in space to which the respective image is associated, said displaying mechanism remote and apart from and out of contact with the V viewers, said displaying mechanism in communication with the sensor mechanism, the displaying mechanism includes a computer which receives information from the sensor mechanism identifying where each eye is in space and produces said images, the computer causes a first image of the N images and a second image of the N images associated with a first viewer of the V viewers to be shown interleaved on the first screen wherein spacing between the interleaved first image and second image varies as a function of where each eye is in space to which the respective image is associated.

2. A displayer as described in claim 1 wherein the displaying mechanism produces the N different images so each of the N eyes can only see its associated image and no other image of the N images.

3. A displayer as described in claim 2 wherein the displaying mechanism includes a first screen connected to the computer on which the image is shown, and a second screen adapted to be adjacent to and disposed between the first screen and the N eyes which selectively reveals portions of the first screen to viewers.

4. A displayer as described in claim 3 wherein the sensor mechanism includes a first video camera adjacent a second screen which monitors where the eyes are in space.

5. A displayer as described in claim 4 wherein the displaying mechanism includes an illumination source disposed behind the first screen which illuminates the first screen.

6. A displayer as described in claim 5 wherein the computer causes a mask pattern to be shown on the second screen corresponding to the interleaving of the first and second images so the first viewer can only see the first image with the first viewer's first eye and the second image with the first viewer's second eye.

7. A displayer as described in claim 6 wherein the first image and second image are interleaved vertical image stripes and the mask pattern comprises light blocking opaque vertical stripes that change as the first viewer moves so the first viewer can always see the first image with the first eye and the second image with the seconded eye.

8. A displayer as described in claim 7 wherein the width of the vertical opaque stripes of the mask pattern varies dynamically according to the ratio (gap between image and mask)/(half the mask stripe width)

EQUALS (observer's distance from screen)/(distance between left and right eye).

9. A displayer as described in claim 8 wherein the spacing between the interleaved vertical image stripes is a tapered perspective linear function.

10. A displayer as described in claim 9 wherein the sensor mechanism includes V cameras to locate the position of the eyes of the V viewers.

11. A displayer as described in claim 10 wherein an nth location in the sequence of stripe locations on the first screen can be calculated by iterating $x_{n+1}=Ax_n+B$:

$x_0=0$ $x_1=B$ $x_2=AB+B$ $x_3=A^2B+AB+B$ $x_n=B(A^{n-1}+ \ldots +A+1)$ $A=(1-p_y^{-1})/(1-q_y^{-1})$ $B=(p_x p_y^{-1}-q_x q_y^{-1})/(1-q_y^{-1})$ and the position of the two eyes of the viewer are $p=(p_x,p_y)$ and $q=(q_x,q_y)$.

12. A displayer as described in claim 11 wherein the N images are synthetically generated and formed into the first and second images by synthetic image interpolation by the computer.

13. A displayer as described in claim 11 includes a scene camera mechanism which takes pictures for the N images and the computer forms the first and second images by synthetic image interpolation.

14. A displayer as described in claim 13 wherein the mask pattern has clear stripes disposed between the opaque stripes, and there is a distance of P 2 between the left edge of each clear stripe, and the width of each clear stripe is P 2/3.

15. A displayer as described in claim 14 wherein the spacing of the clear stripes and the opaque stripes is $f_p(x_i)$ for all i=0,2,4 . . . (even positive integers).

16. A displayer as described in claim 15 wherein the computer interleaves the first and second images of the first screen into evenly spaced vertical image stripes so that from the first viewer's first eye even numbered image stripes are completely blocked by opaque stripes on the second screen and from the first viewer's second eye odd numbered image stripes are completely blocked by opaque stripes on the second screen.

17. A displayer as described in claim 16 wherein the first screen includes a PI-cell.

18. A method for displaying comprising the steps of:
    viewing where a viewer is disposed in space with a camera;
    determining where the viewer's first eye and second eye are disposed in space with a computer connected to the camera;
    interleaving a first image and a second image onto a first screen;
    varying spacing between the interleaved first image and second image as a function of where each eye is in space to which the respective image is associated; and
    coordinating a display of a mask pattern on a second screen disposed between the first screen and the viewer so the viewer only sees the first image of the first screen with the viewer's first eye and only sees the second screen with the viewer's second eye.

19. A method as described in claim 18 including after the coordinating step there are the steps of moving the viewer in space and changing the mask pattern dynamically to make opaque stripes narrower when the viewer moves away from the second screen and to make the opaque stripes wider as the viewer moves toward the second screen.

20. A method as described in claim 19 wherein the spacing between the interleaved vertical image stripes is a tapered perspective linear function.

21. A method as described in claim 20 wherein an nth location in the sequence of stripe locations on the first screen can be calculated by iterating $x_{n+1}=Ax_n+B$:

$x_0=0$ $x_1=B$ $x_2=AB+B$ $x_3=A^2B+AB+B$ $x_n=B(A^{n-1}+ \ldots +A+1)$ $A=(1-p_y^{-1})/(1-q_y^{-1})$ $B=(p_x p_y^{-1}-q_x q_y^{-1})/(1-q_y^{-1})$ and the position of the two eyes of the viewer are $p=(p_x,p_y)$ and $q=(q_x,q_y)$.

22. A method as described in claim 21 wherein the spacing of the clear stripes and the opaque stripes is $f_p(x_i)$ for all i=0,2,4 . . . (even positive integers).

23. A displayer comprising:
    a sensor mechanism for identifying where N different eyes of the viewers are in space, where N is greater than or equal to 2 and is in integer and V is greater than or equal to 1 and is an integer; and
    a mechanism for displaying N different images to N different eyes where each image is a function of where each eye is in space to which the respective image is associated, said displaying mechanism having no moving parts, said displaying mechanism in communication with the sensor mechanism, the displaying mechanism includes a computer which receives information from the sensor mechanism identifying where each eye is in space and produces said images, the computer causes a first image of the N images and a second image of the N images associated with a first viewer of the V viewers to be wherein spacing between the interleaves first image and second image varies as a function of where each eye is in space to which the respective image is associated shown interleaved on the first screen.

* * * * *